(12) United States Patent
Takeuchi et al.

(10) Patent No.: US 11,268,456 B2
(45) Date of Patent: Mar. 8, 2022

(54) ENGINE OPERATING DEVICE AND WORKING MACHINE

(71) Applicant: HONDA MOTOR CO., LTD., Tokyo (JP)

(72) Inventors: Masashi Takeuchi, Wako (JP); Ronny Borsdorf, Hessen (DE); Niels Staar, Hessen (DE)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/336,959

(22) PCT Filed: Mar. 28, 2018

(86) PCT No.: PCT/JP2018/012633
§ 371 (c)(1),
(2) Date: Mar. 27, 2019

(87) PCT Pub. No.: WO2019/186744
PCT Pub. Date: Oct. 3, 2019

(65) Prior Publication Data
US 2021/0348570 A1 Nov. 11, 2021

(51) Int. Cl.
*F02D 11/02* (2006.01)
*A01B 33/02* (2006.01)
(Continued)

(52) U.S. Cl.
CPC .............. *F02D 11/02* (2013.01); *F02D 11/04* (2013.01); *A01B 33/08* (2013.01)

(58) Field of Classification Search
CPC .......... F02D 11/02; F02D 11/04; F02D 31/00; A01B 33/08; A01D 34/6806; A01D 2034/6843; A01D 2101/00; F02B 63/02
See application file for complete search history.

(56) References Cited

U.S. PATENT DOCUMENTS 5,842,552 A * 12/1998 Colber, Jr .......... A01D 34/6806
192/111.12
6,769,501 B2 8/2004 Iida et al.
(Continued)

FOREIGN PATENT DOCUMENTS

CA 2287467 A1 * 10/1999
EP 1441152 A2 7/2004
(Continued)

OTHER PUBLICATIONS

Indian Office Action for Indian Patent Application No. 201947011886 dated Mar. 21, 2021.
(Continued)

*Primary Examiner* — Vinh Luong
(74) *Attorney, Agent, or Firm* — Amin, Turocy & Watson, LLP

(57) ABSTRACT

An engine operating device of a working machine includes a control assembly installed in a body, an operating lever mounted on a handle, and an operating cable. The control assembly includes a base member, a stop switch secured to the base member, and a lever member supported by the base member. The operating cable includes a throttle wire, a stop wire, and a cable tube in which the throttle wire and the stop wire are fitted. As the operating lever is moved to an engine stop position, the lever member moves to a release position, causing an engine to stop.

11 Claims, 3 Drawing Sheets

(51) Int. Cl.
*F02D 11/04* (2006.01)
*A01B 33/08* (2006.01)

(56) References Cited

U.S. PATENT DOCUMENTS

| | | | | |
|---|---|---|---|---|
| 2003/0006073 | A1* | 1/2003 | Iida | A01D 34/6806 180/19.1 |
| 2005/0279066 | A1* | 12/2005 | Osborne | A01D 34/824 56/10.8 |
| 2007/0234999 | A1 | 10/2007 | Tanaka et al. | |
| 2008/0006240 | A1* | 1/2008 | Geyer | F02D 11/04 123/319 |
| 2011/0214641 | A1* | 9/2011 | Vaughn | F02D 31/00 123/376 |
| 2020/0146213 | A1* | 5/2020 | Goman | A01D 34/47 |

FOREIGN PATENT DOCUMENTS

| | | |
|---|---|---|
| EP | 1441152 A3 | 5/2008 |
| EP | 3213613 | 9/2017 |
| JP | 2017-148003 | 8/2017 |
| WO | WO 2017066396 A1 * | 4/2017 |

OTHER PUBLICATIONS

International Search Report and Written Opinion for International Application No. PCT/JP2018/012633 dated Mar. 28, 2018, 8 pages.

* cited by examiner

FIG. 2

ENGINE OPERATING DEVICE AND WORKING MACHINE

TECHNICAL FIELD

The present invention relates to engine operating devices and working machines allowing throttle adjustment and stop switch operation for engines.

BACKGROUND ART

Typical working machines such as tillers include operating levers serving as operating members mounted on handles to adjust engine throttles (for example, see Japanese Laid-Open Patent Publication No. 2017-148003)

SUMMARY OF INVENTION

In addition to the operating lever, such a working machine may also include a stop switch in the vicinity of the handle so that while the working machine is operating, the engine can be stopped as required—for example, in case of emergency. However, to provide such a stop switch for the working machine, a dedicated harness needs to be routed from the engine to the vicinity of the handle. This requires a complicated assembly work.

The present invention has been devised taking into consideration the aforementioned problems, and has the object of providing an engine operating device and a working machine not requiring routing of a dedicated harness for a stop switch from an engine to the vicinity of a handle and thus having fewer assembly steps.

According to an aspect of the present invention, an engine operating device installed in a working machine comprises a control assembly that includes a base member, a stop switch secured to the base member, and a lever member supported by the base member to be displaceable between a push position where the lever member pushes the stop switch and a release position where the lever member releases the pressure on the stop switch and that is installed in a body of the working machine, an operating member mounted on a handle of the working machine to be operated by a worker, and an operating cable connected with the control assembly and the operating member, wherein the operating cable includes a throttle wire connected with a throttle of an engine at one end portion and with the operating member at another end portion, a stop wire connected with the lever member at one end portion and with the operating member at another end portion, and a cable tube in which the throttle wire and the stop wire are fitted, and, as the operating member is moved to a predetermined engine stop position, the lever member connected with the stop wire moves to the release position and causes the engine to stop.

The engine operating device requires routing of only one operating cable, which is relatively easy, instead of routing a harness dedicated for the stop switch from the engine of the working machine to the vicinity of the handle in addition to a cable for throttle operation. Consequently, the number of assembly steps can be reduced compared with a case where the stop switch is disposed adjacent to the handle. Moreover, operation of the operating member mounted on the handle allows both throttle adjustment and stop switch operation. This provides an excellent operability. In addition, the stop switch is attached adjacent to the engine (body) and thus provides a stable quality function.

According to another aspect of the present invention, a working machine is provided with a body including an engine, a handle extending from the body, and an engine operating device installed in the body and the handle, wherein the engine operating device includes a control assembly that includes a base member, a stop switch secured to the base member, and a lever member supported by the base member to be displaceable between a push position where the lever member pushes the stop switch and a release position where the lever member releases the pressure on the stop switch and that is installed in the body, an operating member mounted on the handle to be operated by a worker, and an operating cable connected with the control assembly and the operating member, the operating cable includes a throttle wire connected with a throttle of the engine at one end portion and with the operating member at another end portion, a stop wire connected with the lever member at one end portion and with the operating member at another end portion, and a cable tube in which the throttle wire and the stop wire are fitted, and, as the operating member is moved to a predetermined engine stop position, the lever member connected with the stop wire moves to the release position and causes the engine to stop.

BRIEF DESCRIPTION OF DRAWINGS

FIG. 2 is a schematic view of the engine operating device; and

DESCRIPTION OF EMBODIMENT

A preferred embodiment of a working machine and an engine operating device according to the present invention will be described below with reference to the accompanying drawings.

Figure 1:
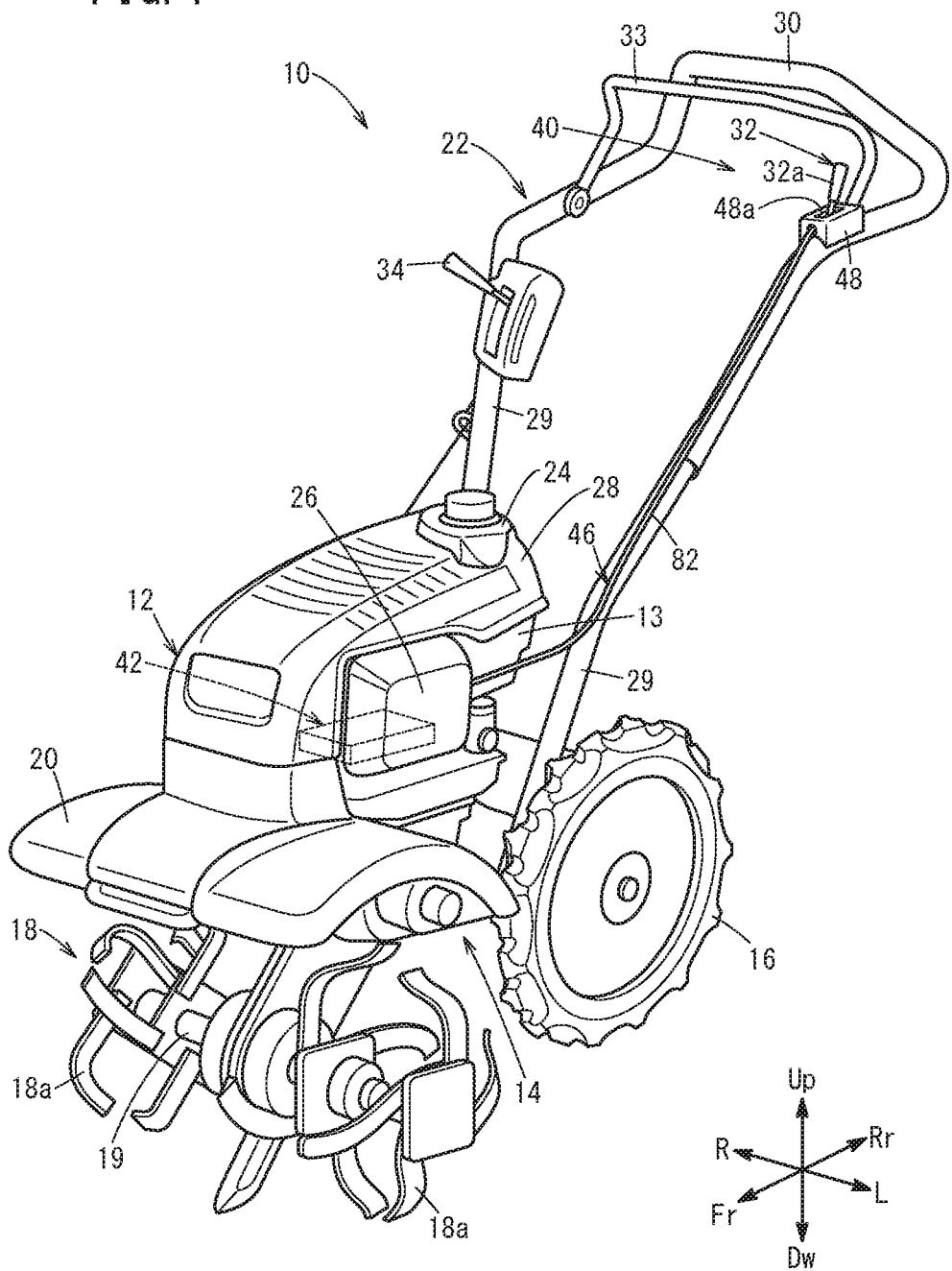
FIG. 1 is a perspective view of a working machine (tiller) including an engine operating device according to an embodiment of the present invention.
Figure 2:
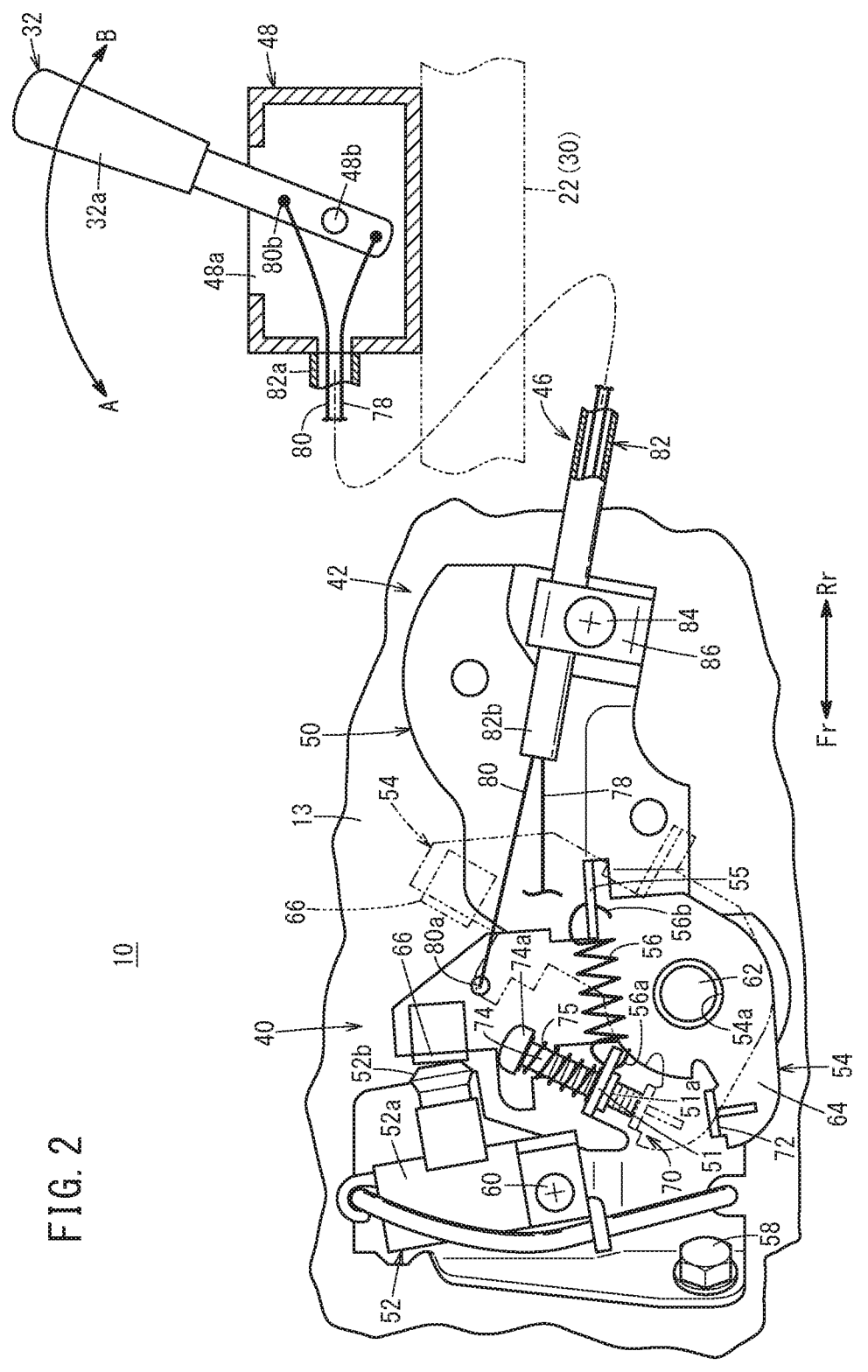
Figure 3:
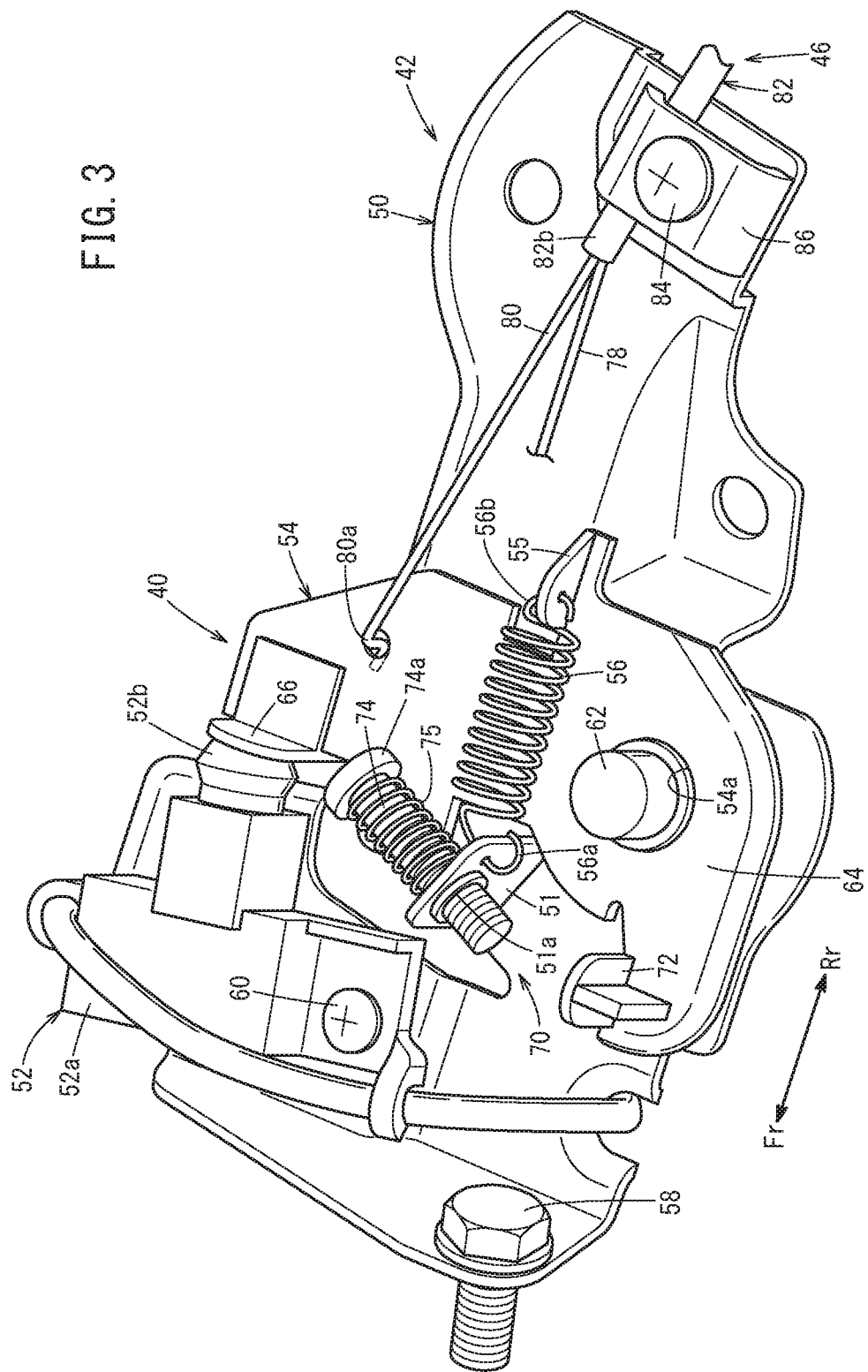
FIG. 3 is a perspective view of a control assembly in the engine operating device.

In FIGS. 1 to 3, an arrow Fr points ahead of a tiller 10 and an arrow Rr points behind the tiller 10. In FIG. 1, an arrow Up points vertically upward, an arrow Dw points vertically downward, an arrow L points towards the left of the tiller 10 (the left of a worker), and an arrow R points towards the right of the tiller 10 (the right of the worker).

As illustrated in FIG. 1, the tiller 10, which is one example of the working machine, includes a body 12 including an engine 13 (internal combustion engine), a transmission 14 provided at a lower portion of the body 12, a pair of left and right wheels 16 provided at a rear portion of the body 12, a tiller rotor 18 provided at a front portion of the transmission 14 in a rotatable manner, a fender 20 covering an upper portion of the tiller rotor 18, and a handle 22 extending rearward and upward from a rear portion of the body 12.

The tiller 10 in the figure is of a "front rotary type" in which the tiller rotor 18 is disposed in front of the wheels 16. However, the tiller 10 to which the present invention is applicable may be of a "rear rotary type" which arranges the tiller rotor 18 behind the wheels 16 or of a "shaft rotor type" which does not have the wheels 16. The working machines to which the present invention is applicable is not limited to the tiller 10, and may include lawn mowers, mowers, snowplows, and the like.

In addition to the engine 13, the body 12 includes a fuel tank 24 disposed above the engine 13 and an air cleaner 26 disposed on a side of the engine 13. The engine 13 is covered with an engine cover 28. The transmission 14 transmits the driving force of the engine 13 to the tiller rotor 18. The tiller rotor 18 includes a plurality of tines 18a. The tiller rotor 18 is secured to a rotating shaft 19 extending below the transmission 14 in the width direction (transverse direction) of the body. Thus, the tiller rotor 18 is rotatable about the shaft extending in the width direction of the body.

The handle 22 includes two left and right link arms 29 connected with the rear part of the body 12 and extending diagonally upward and a U-shaped handle body 30 disposed at upper and rear parts of the two link arms 29. The handle body 30 connects the two link arms 29 with each other. The handle 22 is provided with an engine operating lever 32 (hereinafter referred to as "operating lever 32"), a power transmission switch lever 33, and a transmission switch lever 34.

The operating lever 32 is an operating member for adjusting the number of rotations of the engine and stopping the engine. The power transmission switch lever 33 is an operating member for switching the power transmission from the engine 13 towards the wheels 16 and the tiller rotor 18. The transmission switch lever 34 is an operating member for switching on and off a differential function of the transmission 14.

The tiller 10 includes an engine operating device 40. The engine operating device 40 includes a control assembly 42 provided for the body 12, the operating lever 32 provided for the handle 22, and an operating cable 46 connected with the control assembly 42 and the operating lever 32. The control assembly 42 is secured to the engine 13 by bolts for example at a horizontal orientation. The control assembly 42 is disposed between a cylinder barrel of the engine 13 and the air cleaner 26, specifically, above the cylinder barrel of the engine 13 and below the air cleaner 26. Consequently, an upper part of the control assembly 42 is covered with the air cleaner 26.

The operating lever 32 is supported by a lever supporting member 48 secured to the handle body 30 such that the operating lever 32 is tiltable forward and backward about an axis extending in the width direction (transverse direction) of the body. The operating lever 32 protrudes from an elongated opening 48a that is formed in the top surface of the lever supporting member 48 and extends in the front-back direction of the working machine. The operating cable 46 is disposed along the handle 22. When a worker (user) operates the operating lever 32, the operating force is transmitted to the engine 13 and the control assembly 42 via the operating cable 46.

As illustrated in FIG. 2, a lower part of the operating lever 32 is located inside the lever supporting member 48 having a box shape and is supported by a supporting shaft portion 48b provided inside the lever supporting member 48 to be rotatable about the axis extending in the width direction of the body within a predetermined angle range. The worker grasps a grip 32a provided at an upper part of the operating lever 32 and operates the operating lever 32. Moving the operating lever 32 forward (rotation in a direction of an arrow A) corresponds to an operation in a direction of increasing the throttle opening of the engine 13.

An engine stop position is set in a movable range of the operating lever 32 in a direction opposite the direction of increasing the throttle opening. Moving the operating lever 32 backward (rotation in a direction of an arrow B) corresponds to an operation in a direction of reducing the throttle opening of the engine 13 and stopping the engine 13. The throttle opening is minimized at the position of the operating lever 32 illustrated in FIG. 2. The position the operating lever 32 reaches when moved (inclined) backward from the position of the operating lever 32 illustrated in FIG. 2 (home position) corresponds to the engine stop position.

As illustrated in FIGS. 2 and 3, the control assembly 42 includes a base member 50 attached to the engine 13, a stop switch 52 secured to the base member 50, a lever member 54 supported by the base member 50, and a return spring 56 which is one example of a biasing member elastically biasing the lever member 54. The base member 50 is a plate-like part secured to the engine 13 by a bolt 58 which is a fastening member. The base member 50 is disposed horizontally (such that the thickness direction is parallel with the vertical direction).

The stop switch 52 is secured to the base member 50 by a screw 60 which is a fastening member. The stop switch 52 includes a switch body 52a and a button portion 52b (portion to be pushed) protruding from the switch body 52a. The switch body 52a is secured to the base member 50. The button portion 52b is movable with respect to the switch body 52a in the direction along which the button portion 52b protrudes. While the button portion 52b is pushed, the button portion 52b is pushed into the switch body 52a, and the switch body 52a does not output a stop signal to the engine 13. While the button portion 52b is not pushed, the length of the button portion 52b protruding from the switch body 52a increases due to the spring force, and the switch body 52a outputs the stop signal to the engine 13.

The lever member 54 is supported by the base member 50 to be displaceable between a push position where the lever member 54 pushes the stop switch 52 (position of the lever member 54 indicated by solid lines in FIG. 2) and a release position where the lever member 54 releases the pressure on the stop switch 52 (position of the lever member 54 indicated by virtual lines in FIG. 2). The lever member 54 is a plate-like part. The lever member 54 is supported to be rotatable by a cylindrical rotation support shaft 62 protruding from the base member 50. The lever member 54 has a circular support hole portion 54a, and the rotation support shaft 62 is fitted in the support hole portion 54a. FIGS. 2 and 3 illustrate the lever member 54 at the push position where the lever member 54 is pushing the stop switch 52.

A push portion 66 configured to push the button portion 52b of the stop switch 52 is disposed at one end part of the lever member 54. Specifically, the lever member 54 includes a base plate portion 64 and the push portion 66 protruding from one end part of the base plate portion 64 in the thickness direction of the base plate portion 64 (upward). The push portion 66 can push the button portion 52b of the stop switch 52 toward the switch body 52a.

The control assembly 42 includes an adjustment mechanism 70 configured to adjust the rotation range of the lever member 54. The adjustment mechanism 70 includes a contact piece 72 provided for the lever member 54 and an adjustment screw 74 supported by the base member 50. The contact piece 72 is disposed at another end part of the lever member 54 and protrudes in the thickness direction of the base plate portion 64 (upward).

The adjustment screw 74 is screwed into a screw hole 51a formed in a protruding piece 51 protruding from the base member 50. A spring 75 is disposed between the head 74a of the adjustment screw 74 and the protruding piece 51 in a compressed state. The lever member 54 can rotate up to a position where the contact piece 72 comes into contact with the adjustment screw 74. Thus, the rotation range of the lever member 54 can be adjusted by changing the length of the adjustment screw 74 protruding from the protruding piece 51.

The return spring 56 elastically biases the lever member 54 toward the push position at all times. One end portion 56a of the return spring 56 is connected with the protruding piece 51 provided for the base member 50. Another end portion 56b of the return spring 56 is connected with a connection protrusion 55 provided for the lever member 54. The return spring 56 is disposed between the push portion 66 and the rotation support shaft 62. The return spring 56 is not limited to a coil spring and may be a torsion spring. The form of the biasing member is not limited to a spring. The biasing member may be made of, for example, rubber.

As illustrated in FIG. 2, the operating cable 46 includes a throttle wire 78 one end portion of which is connected with a throttle (not illustrated) of the engine 13 and another end portion of which is connected with the operating lever 32, a stop wire 80 one end portion 80a of which is connected with the lever member 54 and another end portion 80b of which is connected with the operating lever 32, and a cable tube 82 in which the throttle wire 78 and the stop wire 80 are fitted. As the operating lever 32 is moved to the engine stop position, the lever member 54 connected with the stop wire 80 moves to the release position, whereby the engine 13 stops.

The throttle wire 78 and the stop wire 80 are connected with the operating lever 32 on both sides of the supporting shaft portion 48b of the operating lever 32. In this embodiment, the throttle wire 78 is connected with the operating lever 32 at a position below the supporting shaft portion 48b. The stop wire 80 is connected with the operating lever 32 at a position above the supporting shaft portion 48b. The operation of inclining the operating lever 32 forward (rotation in the direction of the arrow A) causes the throttle opening to increase. The operation of inclining the operating lever 32 backward (rotation in the direction of the arrow B) causes the throttle opening to decrease and causes the engine 13 to stop.

One end portion (first end portion 82a) of the cable tube 82 is connected with the lever supporting member 48 mounted on the handle 22. Another end portion (second end portion 82b) of the cable tube 82 is connected with the lever member 54. A cable holder 86 is attached to the base member 50 using a screw 84. The second end portion 82b of the cable tube 82 is held between the cable holder 86 and the lever member 54. The throttle wire 78 and the stop wire 80 are displaceable inside the cable tube 82 along the cable tube 82. The throttle wire 78 and the stop wire 80 extend from the second end portion 82b of the cable tube 82.

Next, effects of the engine operating device 40 configured as above will be described.

While a worker does not touch the operating lever 32 or does not apply force on the operating lever 32, the operating lever 32 is disposed at the home position illustrated in FIG. 2. At this position, the lever member 54 (push portion 66) of the control assembly 42 is pushing the button portion 52b of the stop switch 52 due to the elastic force of the return spring 56 (the stop switch 52 is at the ON position). The throttle wire 78 is pulled by the spring force of a throttle return spring (not illustrated) and thus is pulling the operating lever 32. The spring force of the throttle return spring is smaller than the spring force of the return spring 56 of the lever member 54 and therefore the stop wire 80 keeps the operating lever 32 at the home position illustrated in FIG. 2.

When the operating lever 32 (grip 32a) is moved forward from the home position illustrated in FIG. 2 (inclined forward, that is, rotated in the direction of the arrow A) while the engine 13 is running, a part below the supporting shaft portion 48b is displaced backward, and a part above the supporting shaft portion 48b is displaced forward. Thus, the throttle wire 78 that is connected with the part of the operating lever 32 below the supporting shaft portion 48b is pulled backward.

With this movement of the throttle wire 78, the throttle opening of the engine 13 increases. On the other hand, with the forward rotation of the operating lever 32, the stop wire 80 that is connected with the part of the operating lever 32 above the supporting shaft portion 48b becomes only loose between the lever member 54 and the operating lever 32 and does not move the lever member 54.

When the operating lever 32 is moved backward from the home position illustrated in FIG. 2 (inclined backward, that is, rotated in the direction of the arrow B) while the engine 13 is running, the part below the supporting shaft portion 48b is displaced forward, and the part above the supporting shaft portion 48b is displaced backward. Thus, the stop wire 80 that is connected with the part of the operating lever 32 above the supporting shaft portion 48b is pulled backward.

With this movement of the stop wire 80, the lever member 54 that is connected with the stop wire 80 rotates in a direction away from the stop switch 52 (clockwise in FIG. 2) against the elastic force of the return spring 56 and moves to the release position indicated by the virtual lines. With the rotation of the lever member 54, the lever member 54 (push portion 66) releases the pressure on the stop switch 52 (button portion 52b). As a result, the stop switch 52 moves to the OFF position and outputs the engine stop signal. The engine 13 stops based on the engine stop signal.

The engine operating device 40 (and the working machine) produces the following effects.

The engine operating device 40 (and the working machine) requires routing of only one operating cable 46, which is relatively easy, instead of routing a harness dedicated for the stop switch 52 from the engine 13 of the working machine to the vicinity of the handle 22 in addition to a cable for a throttle operation. Consequently, the number of assembly steps can be reduced compared with a case where the stop switch 52 is disposed adjacent to the handle 22. Moreover, operation of the operating member (operating lever 32) mounted on the handle 22 allows both throttle adjustment and stop switch operation. This provides an excellent operability. In addition, the stop switch 52 is attached adjacent to the engine 13 (body 12) and thus provides a stable quality function.

The operating member (operating lever 32) is operable within a predetermined movable range. The engine stop position is set in the movable range in the direction opposite the direction of increasing the throttle opening. This configuration allows the worker to stop the engine 13 as required with an intuitive operation of the operating member (operating lever 32).

The operating member (operating lever 32) is rotatable about the supporting shaft portion 48b. The throttle wire 78 and the stop wire 80 are connected with the operating member (operating lever 32) at the positions opposite each other with respect to the supporting shaft portion 48b. This configuration easily achieves a configuration allowing the direction of operation to increase the throttle opening and the direction of operation to stop the engine 13 to be opposite each other.

The operating member is the operating lever 32 supported to be tiltable in the front-rear direction of the working machine (tiller 10). The throttle wire 78 is connected with the operating lever 32 at the position below the supporting shaft portion 48b. The stop wire 80 is connected with the operating lever 32 at the position above the supporting shaft portion 48b. This configuration causes the throttle opening to increase when the operating lever 32 is inclined forward and causes the engine 13 to stop when the operating lever 32 is inclined backward, allowing the worker to operate intuitively, that is, providing an excellent operability.

When the operating member (operating lever 32) is operated in the direction of increasing the throttle opening, the stop wire 80 becomes loose. This configuration enables the operation of the operating member (operating lever 32) in the direction of increasing the throttle opening without any problems while allowing the lever member 54 to be kept at the push position.

The control assembly 42 includes the biasing member (return spring 56) elastically biasing the lever member 54 to the push position at all times. This configuration can reliably keep the stop switch 52 pushed even when the operating member (operating lever 32) is disposed at an operating position other than the engine stop position, and prevent the engine 13 from stopping unintentionally.

The present invention is not limited to the above-described embodiment, and various modifications can be made without departing from the spirit and scope of the present invention.

What is claimed is:

1. An engine operating device installed in a working machine, comprising:
    a control assembly installed in a body of the working machine and including
        a base member,
        a stop switch secured to the base member, and
        a lever member supported by the base member to be displaceable between a push position where the lever member pushes the stop switch and a release position where the lever member releases pressure on the stop switch;
    an operating member mounted on a handle of the working machine to be operated by a worker; and
    an operating cable connected with the control assembly and the operating member, wherein:
    the operating cable includes:
        a throttle wire connected with a throttle of an engine at one end portion and with the operating member at another end portion;
        a stop wire connected with the lever member at one end portion and with the operating member at another end portion; and
        a cable tube in which the throttle wire and the stop wire are fitted; and
    as the operating member is moved to a predetermined engine stop position, the lever member connected with the stop wire moves to the release position and causes the engine to stop.

2. The engine operating device according to claim 1, wherein:
    the operating member is operable within a predetermined movable range; and
    the engine stop position is set in the movable range in a direction opposite a direction of increasing the throttle opening.

3. The engine operating device according to claim 2, wherein:
    the operating member is rotatable about a supporting shaft portion; and
    the throttle wire and the stop wire are connected with the operating member at positions opposite each other with respect to the supporting shaft portion.

4. The engine operating device according to claim 3, wherein:
    the operating member is an operating lever supported to be tiltable in a front-rear direction of the working machine;
    the throttle wire is connected with the operating lever at a position below the supporting shaft portion; and
    the stop wire is connected with the operating lever at a position above the supporting shaft.

5. The engine operating device according to claim 3, wherein the stop wire becomes loose when the operating member is operated in the direction of increasing the throttle opening.

6. The engine operating device according to claim 1, wherein the control assembly includes a biasing member elastically biasing the lever member to the push position at all times.

7. The engine operating device according to claim 2, wherein the control assembly includes a biasing member elastically biasing the lever member to the push position at all times.

8. The engine operating device according to claim 3, wherein the control assembly includes a biasing member elastically biasing the lever member to the push position at all times.

9. The engine operating device according to claim 4, wherein the control assembly includes a biasing member elastically biasing the lever member to the push position at all times.

10. The engine operating device according to claim 5, wherein the control assembly includes a biasing member elastically biasing the lever member to the push position at all times.

11. A working machine comprising a body including an engine, a handle extending from the body, and an engine operating device installed in the body and the handle, wherein:
    the engine operating device includes:
        a control assembly installed in the body and including
            a base member,
            a stop switch secured to the base member, and
            a lever member supported by the base member to be displaceable between a push position where the lever member pushes the stop switch and a release position where the lever member releases pressure on the stop switch;
        an operating member mounted on the handle to be operated by a worker; and
        an operating cable connected with the control assembly and the operating member;
    the operating cable includes:
        a throttle wire connected with a throttle of the engine at one end portion and with the operating member at another end portion;
        a stop wire connected with the lever member at one end portion and with the operating member at another end portion; and
        a cable tube in which the throttle wire and the stop wire are fitted; and
    as the operating member is moved to a predetermined engine stop position, the lever member connected with the stop wire moves to the release position and causes the engine to stop.

* * * * *